US005553320A

United States Patent [19]

Matsuura et al.

[11] Patent Number: 5,553,320

[45] Date of Patent: Sep. 3, 1996

[54] AUTOMATIC CASH TRANSACTION MACHINE

[75] Inventors: Nobuhiko Matsuura, Owariasahi; Kunihisa Matsuura, Ama-gun; Yutaka Kako, Owariasahi; Minoru Kadowaki, Toyota, all of Japan

[73] Assignee: Hitachi, Ltd., Tokyo, Japan

[21] Appl. No.: 401,970

[22] Filed: Mar. 9, 1995

[30] Foreign Application Priority Data

Mar. 16, 1994 [JP] Japan .................................... 6-045354

[51] Int. Cl.[6] .......................................... G06F 3/00

[52] U.S. Cl. .......................................... 235/379; 902/20

[58] Field of Search .............................. 902/20; 235/379

[56] References Cited

U.S. PATENT DOCUMENTS 4,251,867 2/1981 Uchida et al. ............................ 902/20

FOREIGN PATENT DOCUMENTS 59-134848 9/1984 Japan .
2-98796 5/1986 Japan .
61-88390 5/1986 Japan .
61-204798 9/1986 Japan .
62-50994 3/1987 Japan .
835225 10/1987 Japan .
63-89996 4/1988 Japan .
1-211096 8/1989 Japan .
2-207394 8/1989 Japan .
5-214875 8/1993 Japan .
5-278959 10/1993 Japan .

*Primary Examiner*—Harold Pitts
*Attorney, Agent, or Firm*—Fay, Sharpe, Beall, Fagan, Minnich & McKee

[57] ABSTRACT

The automatic cash transaction machine consists of the recycle box 23 for storing bills which are transported and taken out from the receptacle 21 and the bill cassette 22 for loading bills in the recycle box 23 and withdrawing bills from the recycle box 23, wherein a specific bill kind of large or small denomination bills is assigned to the bill cassette 22, and bills of this bill kind are transported and taken out between the bill cassette 22 and the receptacle 21, and the bill cassette 22 functions also as a recycle box, and the receptacle 21 is installed above the recycle box 23, and the bill discriminator 25 and the reject box 26 are installed above the bill cassette 22.

18 Claims, 15 Drawing Sheets

AUTOMATIC CASH TRANSACTION MACHINE

Industrial Field Of Application

The present invention relates to an automatic cash transaction machine and more particularly to an automatic cash transaction machine by which a user executes transaction accompanied by deposits and payments for a bank account by using a card or passbook and depositing or paying bills.

Prior Art

For example, in an automatic teller machine of a type of depositing and paying bills which is used in banking facilities, at least two kinds of bills such as large denomination bills (for example, 10000-yen bills) and small denomination bills (for example, 1000-yen bills) are handled so as to smooth transaction and improve serviceability. Conventionally, for example, the ATM which is used in banking facilities, as indicated in Japanese Patent Application Laid-Open 62-50994, consists of a strongbox which is called a bill cassette for setting bills and is removable from the transaction machine and strongboxes which are called two recycle boxes to which one bill kind of two kinds of large and small denomination bills is assigned respectively and which are used to store and pay deposited bills for each bill kind. Namely, in the conventional automatic cash transaction machine for handling two kinds of large and small denomination bills, a bill cassette for loading or withdrawing bills and a recycle box for storing recycling bills are structured independently, and it is necessary to install one bill cassette and two recycle boxes, that is, three strongboxes in total in the transaction machine, and there is a problem imposed that the depth and installation area of the transaction machine become large. Therefore, in the automatic cash transaction machine for handling two kinds of large and small denomination bills, various tries have been made so as to realize miniaturization of the transaction machine.

As one of the tries, as indicated in Japanese Patent Application Laid-Open 1-211096, it is known that in an automatic cash transaction machine having a bill cassette and a recycle box, by assigning one bill kind also to the bill cassette during service and by using the bill cassette as a recycle box of the bill kind, the number of necessary strongboxes can be reduced. However, since this prior art utilizes the bill cassette also as a recycle box, it is necessary to newly install a store which is used as a temporary stacker for a specific kind of bills at the time of loading and withdrawing bills and the miniaturization of the whole machine cannot be always realized. Furthermore, to minimize this store as far as possible, it is necessary to select a bill kind with a lowest circulation rate as a bill kind to be assigned to the bill cassette and as a result, the number of bills of the bill kind which can be handled is limited to a small number which depends on the capacity of the store and there are defects caused such that the number of bills and the amount of money which can be handled by the whole machine are reduced and the serviceability is lowered.

As another try, as indicated in Japanese Patent Application Laid-Open 2-207394, it has been considered to install a fixed strongbox and a strongbox which can be mounted and demounted up and down so as to minimize the depth of the transaction machine. However, there is a fixed limitation on the height of the transaction machine so as to guarantee the operability of a user. Therefore, in this structure of the second prior art, the size of the fixed strongbox to be installed on the upper part is extremely limited and the number of bills, which can be handled, of the bill kind which is assigned to the fixed strongbox is extremely reduced.

Furthermore, as a conventional example that the depth of the transaction machine is reduced, as indicated in Japanese Patent Application Laid-Open 5-214875, the front plate on the lower part of the front of the machine is positioned backward and the customer operation section is structured in a table shape. However, in this prior art, nothing is indicated about the internal constitution of the transaction machine and the relationship with the internal constitution of the machine and the performance of the machine which is decided by the number of kinds of large and small denomination bills and number of bills which can be handled are not questionable. In addition, nothing is described about the operability of a user.

Furthermore, as another conventional example, as indicated in Registration of Design No. 835225 and Japanese Utility Model Application Laid-Open 59-134848, an example that a constitution that the customer operation table surface on which the display operation section by which a user performs an input operation interactively with the machine is installed on the operator's side and the cash gateway for bills and coins is installed on the innermost side is inserted slightly deep beyond the front plate on the upper part of the front of the machine is used and as a result, the front plate on the lower part of the front of the machine is positioned backward is known. However, also in this example, nothing is indicated about the relationship with the internal constitution of the machine and the operability of a user.

Problems that the Invention is to Solve

Automation is promoted in banking facilities and many automatic cash transaction machines are installed in various places. From a viewpoint of installation of transaction machines, it is requested to reduce the installation area by more miniaturization so that many transaction machines can be installed layout-free in a limited installation space. From a viewpoint of serviceability to users, not only to improve the operability and usability but also to prolong the usable time zone and minimize limitations on the volume of transaction and kind of large and small denomination bills as much as possible, a transaction machine which can handle many bills of two kinds of large and small denomination bills is requested. Furthermore, from a standpoint of a person who operates and maintains a transaction machine, it is necessary to load or withdraw bills by a simply and brief procedure at the time of start or end of transaction services. However, miniaturization of a transaction machine and improvement of transaction serviceability are generally conflicting needs and as mentioned above, an automatic cash transaction machine for satisfying the above conflicting needs has not been realized.

Therefore, an object of the present invention is to eliminate the difficulties of the prior arts mentioned above and to provide an automatic cash transaction machine which has satisfactory serviceability and uses a small installation area thereof.

Another object of the present invention is to provide an automatic cash transaction machine which can handle many bills of a plurality of kinds of denomination bills or can store many bills.

Still another object of the present invention is to provide an automatic cash transaction machine which has a front which can be easily used by users and has a small depth.

A further object of the present invention is to provide an automatic cash transaction machine which can be simply handled by an operator and an engineer of the transaction machine though there are only a small number of strongboxes installed.

A concrete object of the present invention is to provide an automatic cash transaction machine which can handle bills of two bill kinds of large and small denomination bills in a sufficient amount of money and a sufficient number of bills and has an ultimately small depth with 2 strongboxes installed.

Another concrete object of the present invention is to provide an automatic cash transaction machine which has a customer operation table surface and foot space which are easily operable for users and has a small depth.

Still another concrete object of the present invention is to provide an automatic cash transaction machine in which bills can be simply loaded and withdrawn by an operator and an engineer of the transaction machine though there are only a small number of strongboxes installed.

Means of Solving the Problems

According to the present invention, the above objects and the other objects are accomplished by the characteristics which will be mentioned hereunder.

According to one characteristic of the present invention, an automatic cash transaction machine consisting of a outer box which has an upper front plate and a lower front plate and in which the horizontal cross-sectional shape at an optional location in the vertical direction is almost square, of a bill recycle box which is installed inside the lower part of the outer box, on the operator's side viewed from front, and in the neighborhood of the lower front plate, and of a customer operation table which is installed between the upper part of the outer box and the lower part of the outer box and has a cash gateway on the innermost side viewed from front and a operation display at the central part the operator's side, wherein the leading edge of the operation display of the customer operation table is protruded forward from the lower front plate of the outer box and the cash gateway of the customer operation table is positioned right above the bill recycle box is provided. According to this characteristic, the recycle box and cash gateway are overlapped with each other on a plane projection basis in the neighborhood of the inside of the lower front plate of the transaction machine, so that the depth of the transaction machine can be minimized. Furthermore, since the lower front plate of the outer box is positioned behind the leading edge of the customer operation table, a foot space can be provided for customers and they can operate the transaction machine easily.

According to another characteristic of the present invention, an automatic cash transaction machine consisting of a outer box which has an upper front plate, a lower front plate, and a back plate and in which the horizontal cross-sectional shape at an optional location in the vertical direction is almost square, of a bill recycle box which is installed inside the lower part of the outer box, on the operator's side viewed from front, and in the neighborhood of the lower front plate, of a bill cassette which is installed on the innermost side of the bill recycle box and in the neighborhood of the back plate so that it can be removed from the outer box, and of a customer operation table which is installed between the upper part of the outer box and the lower part of the outer box and has a cash gateway on the innermost side viewed from front and a operation display at the central part on the operator's side, wherein the leading edge of the operation display of the customer operation table is protruded forward from the lower front plate of the outer box and the cash gateway of the customer operation table is positioned right above the bill recycle box is provided.

According to this characteristic, the recycle box and cash gateway are overlapped with each other on a plane projection basis in the neighborhood of the inside of the lower front plate of the transaction machine and the bill cassette is positioned in the neighborhood of the back plate of the transaction machine, so that the depth of the transaction machine can be minimized more.

According to another characteristic of the present invention, the aforementioned automatic cash transaction machine which further has a card handling unit which is installed inside the upper part of the outer box and a card slot which is linked to the card handling unit and installed on the upper front plate is provided.

According to another characteristic of the present invention, the aforementioned automatic cash transaction machine which further has a passbook handling unit which is installed inside the upper part of the outer box and a passbook slot which is linked to the passbook handling unit and installed on the upper front plate is provided.

According to another characteristic of the present invention, the aforementioned automatic cash transaction machine in which the upper front plate is positioned before the trailing edge of the cash gateway is provided.

According to another characteristic of the present invention, the aforementioned automatic cash transaction machine in which the surface of the customer operation table is formed at a rising gradient toward the innermost side is provided. By this characteristic, even when a customer operates the transaction machine close to the customer operation table in the foot space, the easy operation can be ensured.

According to another characteristic of the present invention, the aforementioned automatic cash transaction machine in which the operation display comprises a liquid crystal display panel is provided.

According to another characteristic of the present invention, an automatic cash transaction machine consisting of a outer box which has an upper front plate, a lower front plate, and a back plate and in which the horizontal cross-sectional shape at an optional location in the vertical direction is almost square, of a bill recycle box which is installed inside the lower part of the outer box, on the operator's side viewed from front, and in the neighborhood of the lower front plate and has a first bill take-out and put-in mechanism, of a bill cassette which is installed on the innermost side of the bill recycle box and in the neighborhood of the back plate so that it can be removed from the outer box and has a second bill take-out and put-in mechanism, of a recycle container which is installed inside the center of the outer box and above the bill recycle box and has a third bill take-out and put-in mechanism, of a bill discriminator which is positioned above the bill cassette, and of a bill transport controller which has a bill transport path which is connected to the first bill take-out and put-in mechanism, the second bill take-out and put-in mechanism, and the third bill take-out and put-in mechanism so that it can operate and transports bills of the first bill kind by operating the third bill take-out and put-in mechanism and the first bill take-out and put-in mechanism between the recycle container and the bill recycle box, bills of the second bill kind by operating the third bill take-out and put-in mechanism and the second bill take-out and put-in mechanism between the recycle container and the bill cassette, and bills of the first bill kind and the second bill kind by operating the first bill take-out and put-in mechanism and the second bill take-out and put-in mechanism between the bill recycle box and the bill cassette through the bill discriminator is provided.

By this characteristic, a miniature and serviceable automatic cash transaction machine which can handle two kinds of large and small denomination bills using two strongboxes of the bill recycle box and the bill cassette can be obtained.

According to another characteristic of the present invention, the aforementioned automatic cash transaction machine wherein both of the first bill take-out and put-in mechanism and the second bill take-out and put-in mechanism are a last-in first-out type bill take-out and put-in mechanism is provided.

According to another characteristic of the present invention, the aforementioned automatic cash transaction machine wherein one of the first bill take-out and put-in mechanism and the second bill take-out and put-in mechanism is a last-in first-out type bill take-out and put-in mechanism and the other is a first-in first-out type bill take-out and put-in mechanism is provided.

According to another characteristic of the present invention, the aforementioned automatic cash transaction machine wherein both of the first bill take-out and put-in mechanism and the second bill take-out and put-in mechanism are a first-in first-out type bill take-out and put-in mechanism is provided.

According to another characteristic of the present invention, the aforementioned automatic cash transaction machine wherein the bill recycle box also is removable from the outer box is provided.

The above and other objects and characteristics of the prevent invention will be made more clear by the embodiments which will be explained with reference to the accompanying drawings.

Embodiment

An embodiment of the present invention will be explained hereunder with reference to the accompanying drawings.

Figure 1:
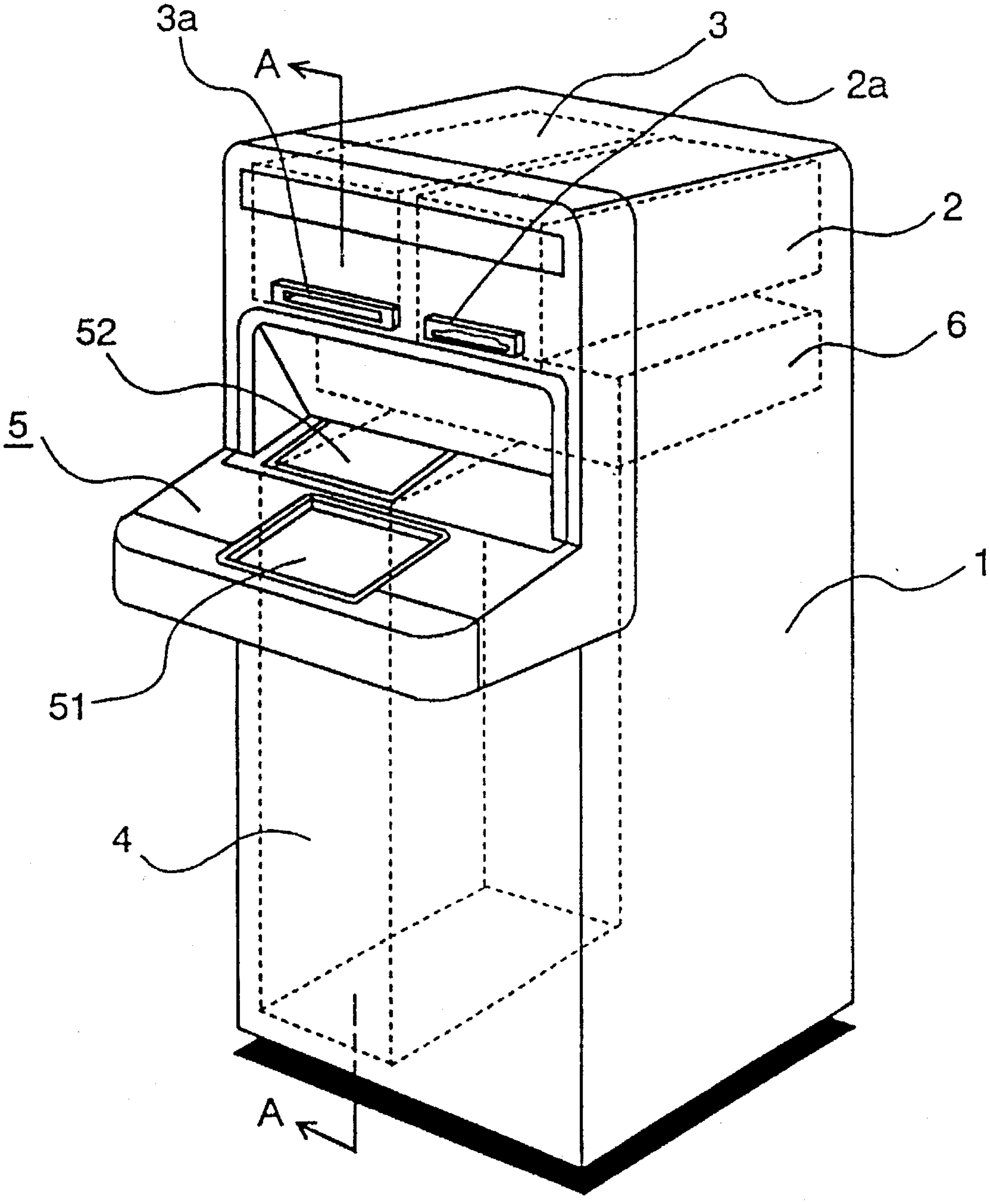
FIG. 1 is a perspective view showing the appearance of an embodiment of the automatic cash transaction machine of the present invention.

FIG. 1 is a perspective view showing the appearance of an automatic cash transaction machine to which the present invention is applied.

On the upper part of a outer box 1 of the transaction machine, a card and voucher handling unit 2*a* which is linked with a card slot 2*a* installed on the upper front plate 1*b* of the frame 1, handles a card of a customer who is a user, is linked with a passbook slot 3*a*, and prints and ejects a transaction voucher and a passbook handling unit 3 for handling a passbook are installed. On the lower part of the outer box 1, a bill recycle mechanism 4 for handling bills is installed and on the middle part, a customer operation table 5 consisting of an operation display 51 for displaying and inputting transaction contents and a cash gateway 52 is installed. A numeral 6 indicates a main controller unit for managing the control for the whole automatic cash transaction machine.

Figure 2:
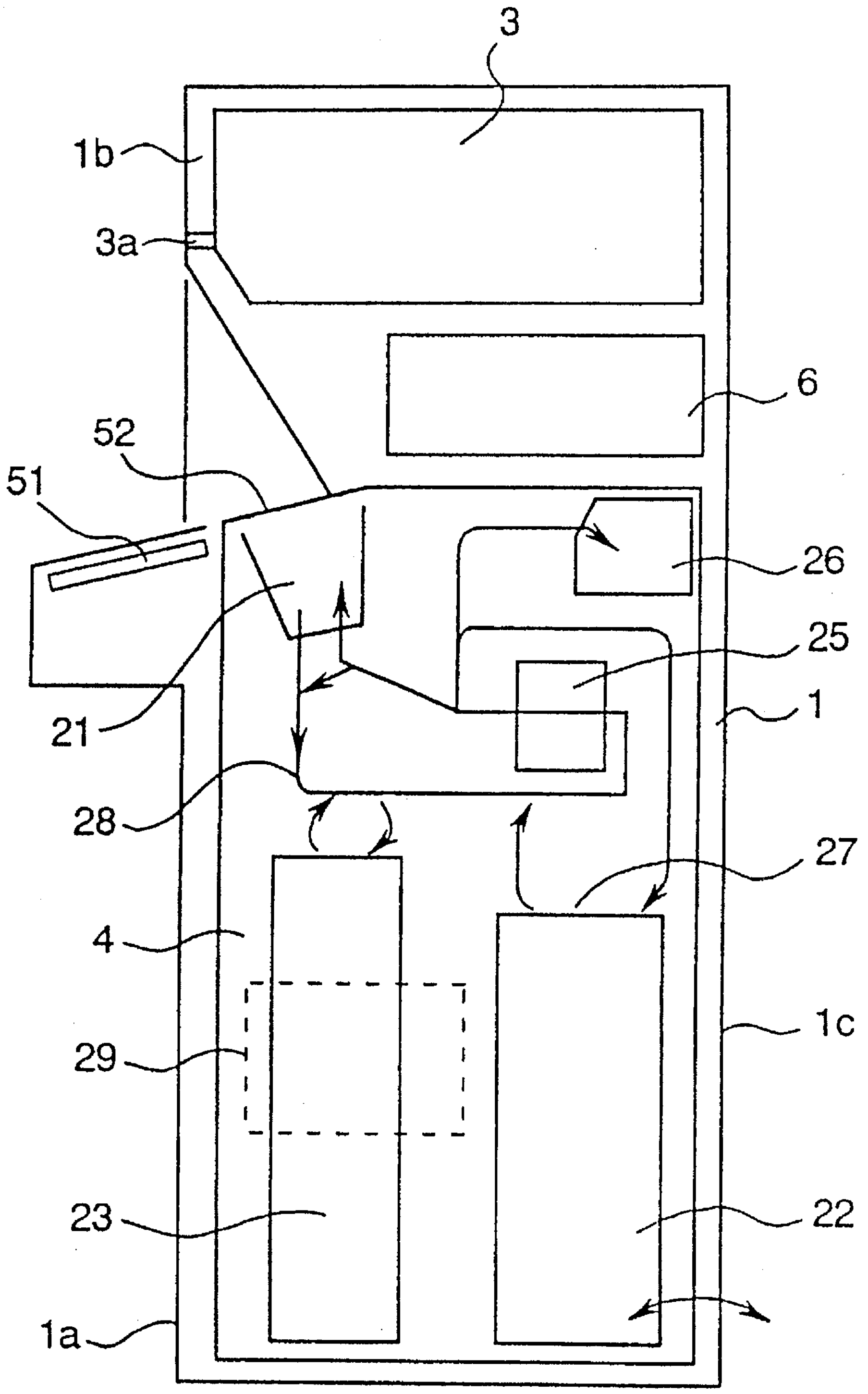
FIG. 2 is a cross-sectional view showing the section of the line A—A shown in FIG. 1 which is simplified.

FIG. 2 is a simplified cross-sectional view showing the section of the line A—A shown in FIG. 1. The area of the operation surface of the customer operation table 5 cannot be made smaller because the size of the operation display 51 is decided to an extent for the reason that it is an interface with customers and the size of the cash gateway 52 is decided to an extent due to the sizes of bills and customers' hands, so that the cash gateway 52 is positioned back to the lower front plate 1*a* and the upper front plate 1*b* of the outer box 1 toward the back plate 1*c*. In addition to it, according to the present invention, the display unit of the operation display 51 is flat because it uses a flat display unit, for example, such as a liquid crystal display unit and the lower front plate 1*a* of the outer box 1 of the transaction machine is positioned behind the leading edge of the operation display 51 so as to form a space under the operation display 51 under the constitution which is another characteristic of the present invention and will be explained later. By doing this, the depth of the transaction machine is reduced, and the installation area on the floor can be made smaller, and furthermore a foot space can be formed for customers, and the operability of customers can be improved.

The bill recycle mechanism 4 consists of a receptacle 21 which is positioned under the cash gateway 52 through which users insert or take out bills, a bill cassette 22 which is used by an operator so as to set paying bills and to withdraw internal bills, a recycle box 23 for storing paying bills and flowing back deposited bills to payment, a discriminator 25 for discriminating and counting bills, a reject-box 26 for storing bills which cannot be discriminated, a temporary stacker 27 for temporarily stacking deposited bills, a bill transport path 28 for transporting bills, and a controller unit 29 for the bill recycle mechanism 4. The controller unit 29 for the bill recycle mechanism 4 controls the bill recycle mechanism 4 according to an instruction from the main controller unit 6 and to detection of the status of the bill recycle mechanism 4 and sends the status requiring a report of the bill recycle mechanism 4 to the main controller unit 6. The bill transport path 28 is indicated by a line in the drawing and there is a switching gate installed at the branch point of the transport path. As described later, the gate transports bills under control between the receptacle 21, the bill cassette 22, the recycle box 23, the bill discriminator 25, and the reject box 26 by the main controller unit 6 and the controller unit 29 and under discrimination of bills by the bill discriminator 25.

In the embodiment shown in FIG. 2, the recycle box 23 is assigned as a recycle box for large denomination bills, and the bill cassette 22 is assigned for small denomination bills in addition to the function for setting bills and functioned as a recycle box for small denomination bills, and two bill kinds of large and small denomination bills can be flowed back under constitution of one recycle box and one bill cassette, that is, two strongboxes in total. Furthermore, in the bill recycle mechanism 4 shown in FIG. 2, the recycle box 23 is positioned in the neighborhood of the lower front plate 1*a* of the outer box 1 and as mentioned above, the receptacle 21 and the recycle box 23 are installed right under the cash gateway 52 of the customer operation table 5 in the neighborhood of the back plate 1*c*, so that the depth of the transaction machine can be made smaller close to the limit thereof and the transaction machine can be miniaturized.

Figure 3:
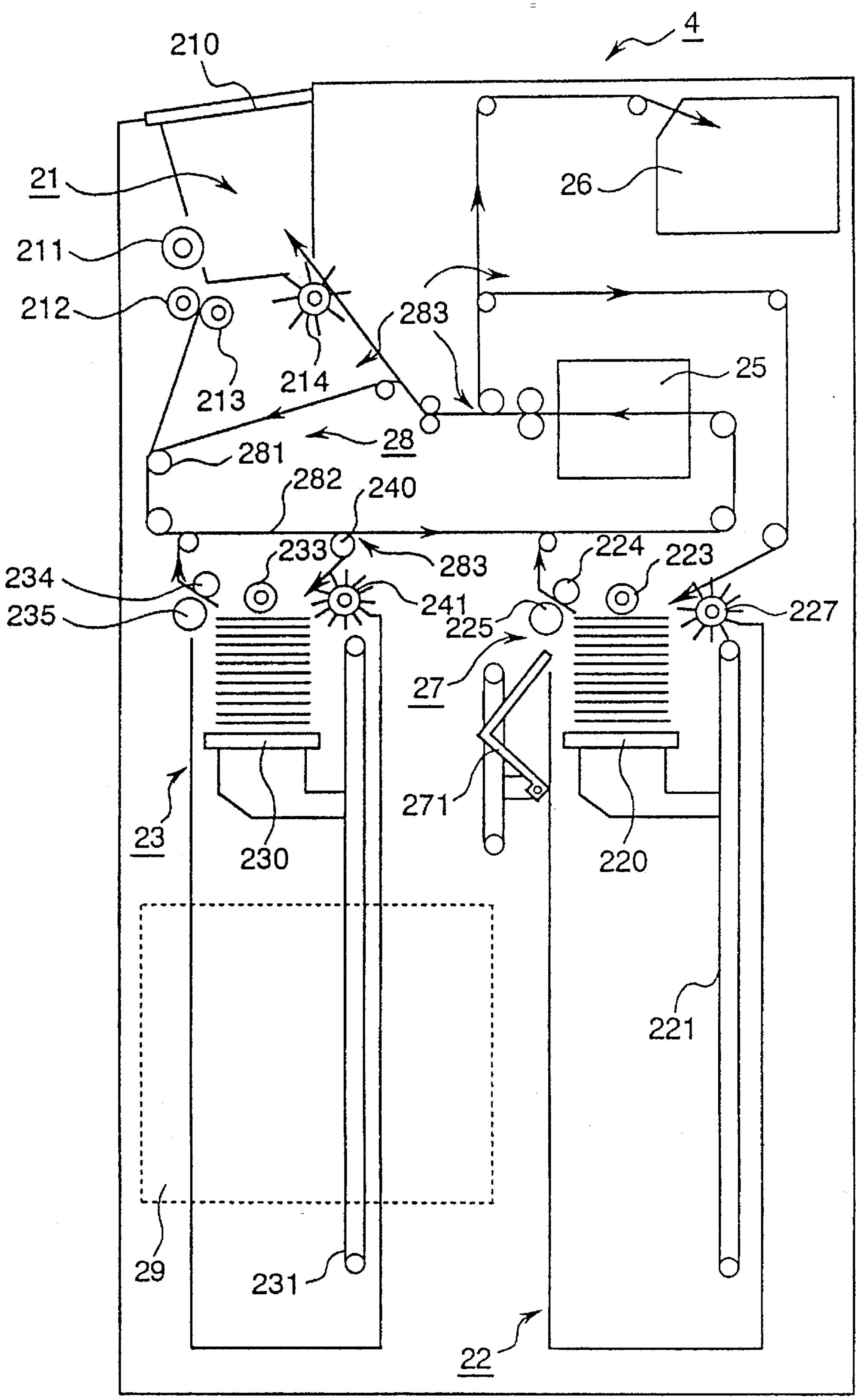
FIG. 3 is a more concrete structural diagram of the bill recycle mechanism shown in FIG. 2.

FIG. 3 is a drawing showing the bill recycle mechanism 4 shown in FIG. 2 more in detail.

The bill receptacle 21 has a shutter 210 and is opened or closed by sliding the shutter 210 and users can take out bills for payment and insert bills for deposit. Inserted bills are fed by rotation of a pickup roller 211 and transported by rotation of a feed roller 212. A numeral 213 indicates a gate roller, which prevents double feed. Bills in the cash receptacle 21 are transported to the bill transport path 28 in this way and fetched in the transaction machine. The bill transport path 28 is structured so as to hold and transport bills by many rollers 281 and a belt 282 which is wound round the rollers. Furthermore, the bill transport path 28 has a gate 283 at each branch point and selects the transport destination by switching the gage 283. Bills which are transported by the cash receptacle 21 or the transport path 28 are fetched in the receptacle 21 by a brush roller 214.

The recycle box 23 accumulates bills on a movable support 230. Bills stored by the recycle box 23 are transported to the transport path one by one by a pickup roller 233, a feed roller 234, and a gate roller 235. The movable support 230 is mounted to a belt 231 and driven vertically by driving the belt 231 by a motor which is shown in the drawing. When bills are to be transported, the movable support is driven upward so as to press bills against the pickup roller 233. The transport path 28 switches the gate 283 to the recycle box 23, sends bills to the recycle box 23 by a roller 240 and a brush roller 241, and accumulates and stores bills on the movable support 230.

Figure 4:
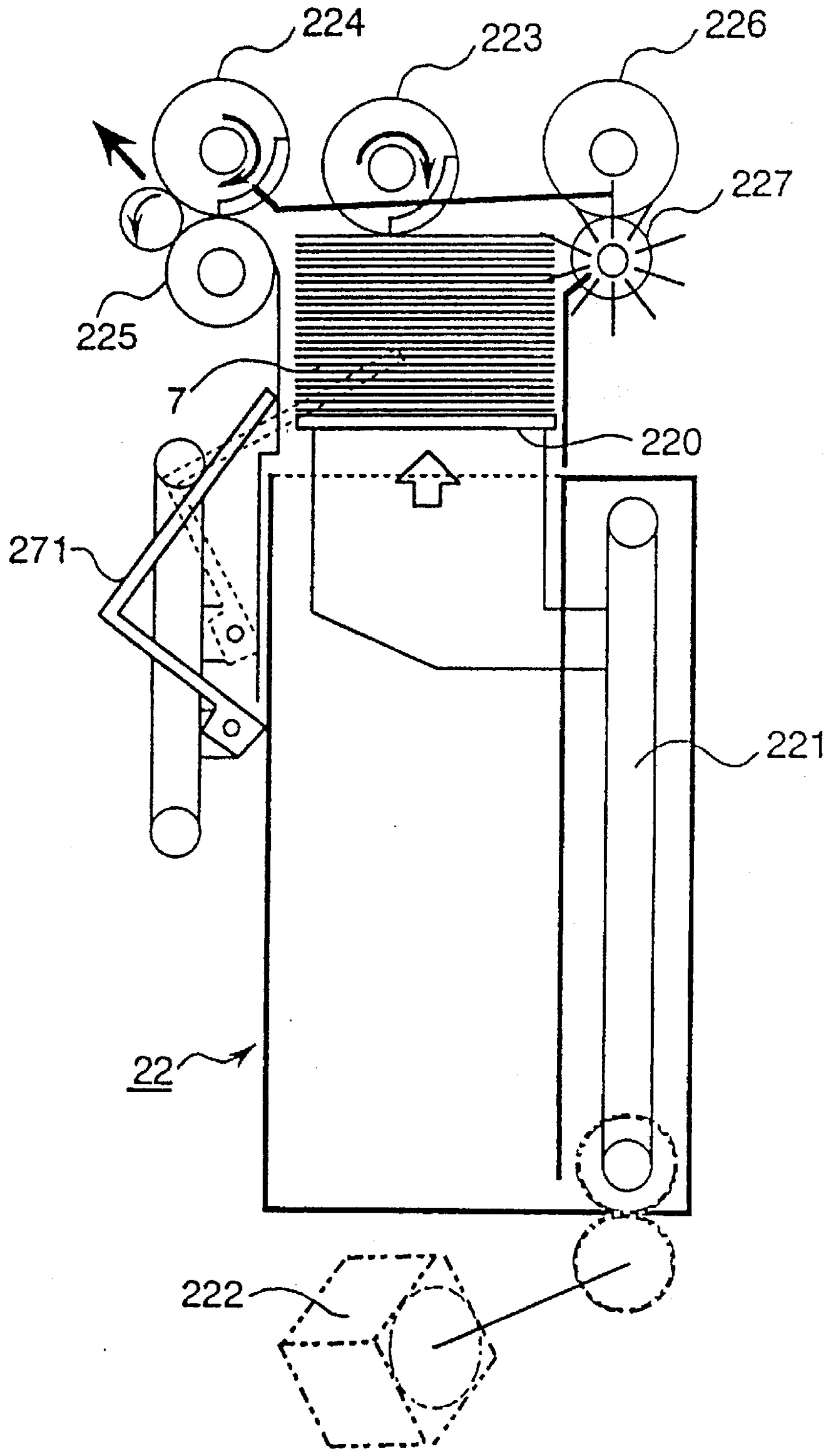
FIG. 4 is a drawing showing the structure of the bill cassette and temporary stacker shown in FIG. 2 in the bill transport state.
Figure 5:
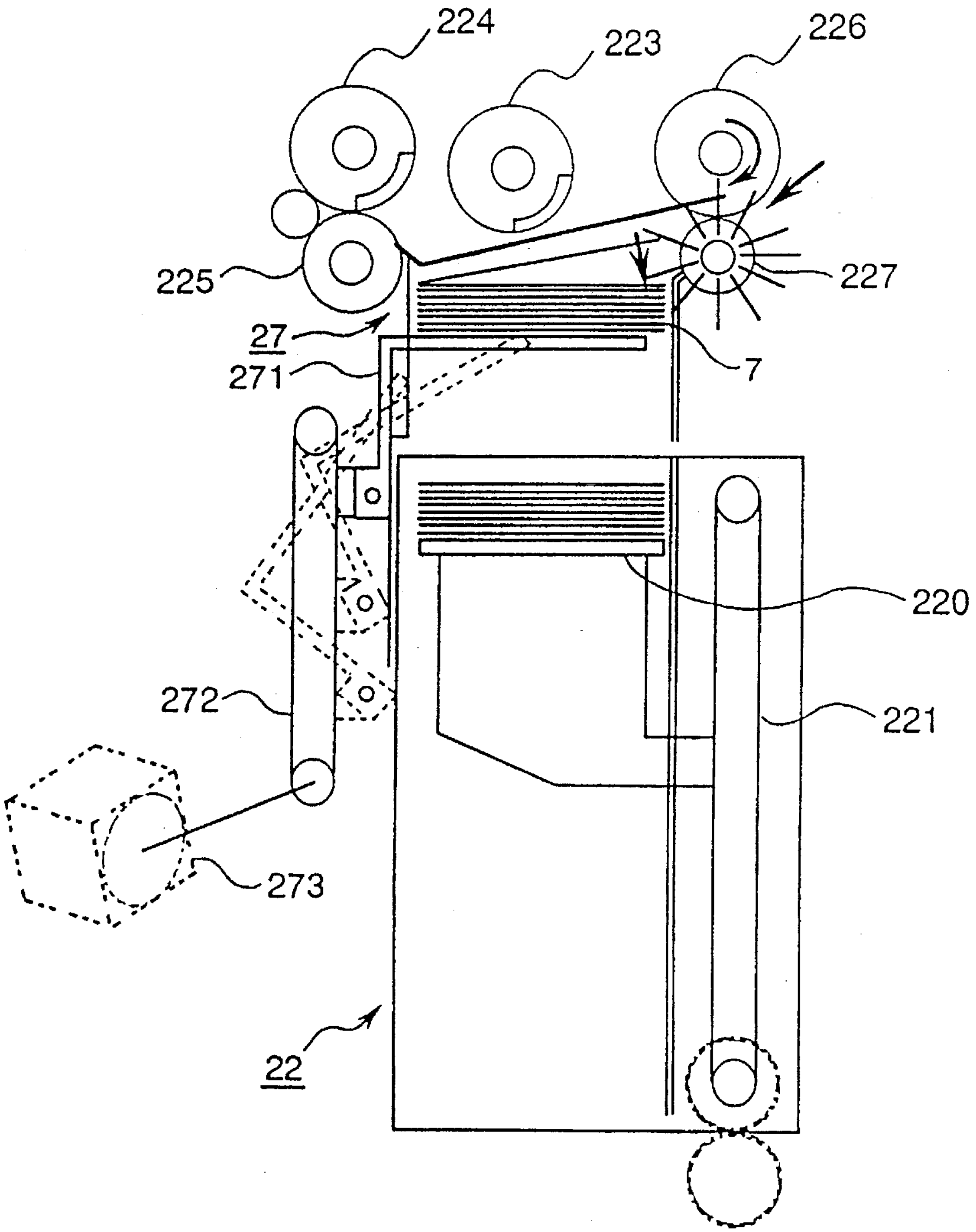
FIG. 5 is a drawing showing the structure of the bill cassette and temporary stacker shown in FIG. 2 in the bill accumulated state.

Detailed structures of the bill cassette 22 and the temporary stacker 27 are shown in FIGS. 4 and 5. FIG. 4 shows a status that bills 7 stored in the bill cassette 22 are transported. The bill cassette 22 accumulates the bills 7 on a movable support 220. A separator 271 of the temporary stacker 27 is turned out as shown by a solid line and the bills 7 stored in the bill cassette 22 are transported to the transport path one by one by a pickup roller 223, a feed roller 224, and a gate roller 225. The movable support 220 is mounted to a belt 221 and moved vertically by driving the belt 221 by a motor 222. When bills are to be transported as shown in FIG. 4, the movable support is driven upward so as to press the bills 7 against the pickup roller 223.

FIG. 5 shows a status that the bills 7 are accumulated on the temporary stacker 27. The movable support 220 is moved down. The separator 271 of the temporary stacker 27 is mounted to a belt 272 and when the belt 272 is driven by a motor 273, the separator 271 is moved from the turning-out position shown in FIG. 4 to the position shown in FIG. 5 where bills are to be accumulated and bills are sent from the transport path by a roller 226 and a brush roller 227 and accumulated on the separator 271. The bills 7 accumulated on the separator 271 are transported to the transport path one by one by the pickup roller 223, the feed roller 224, and the gate roller 225 which are used so as to transport bills in the cassette 22. To accumulate bills which are sent from the transport path on the movable support 220 (to store in the bill cassette 22), the separator 271 is turned out as shown in FIG. 4 and bills which are sent by the roller 226 and the brush roller 227 are accumulated on it.

As mentioned above, the receptacle 21, the bill cassette 22, the recycle box 23, the reject box 26, and the temporary stacker 27 have a bill take-out and put-in mechanism comprising a feed roller, gate roller, and brush roller so as to take out or transport bills from or to the transport path.

Figure 6:
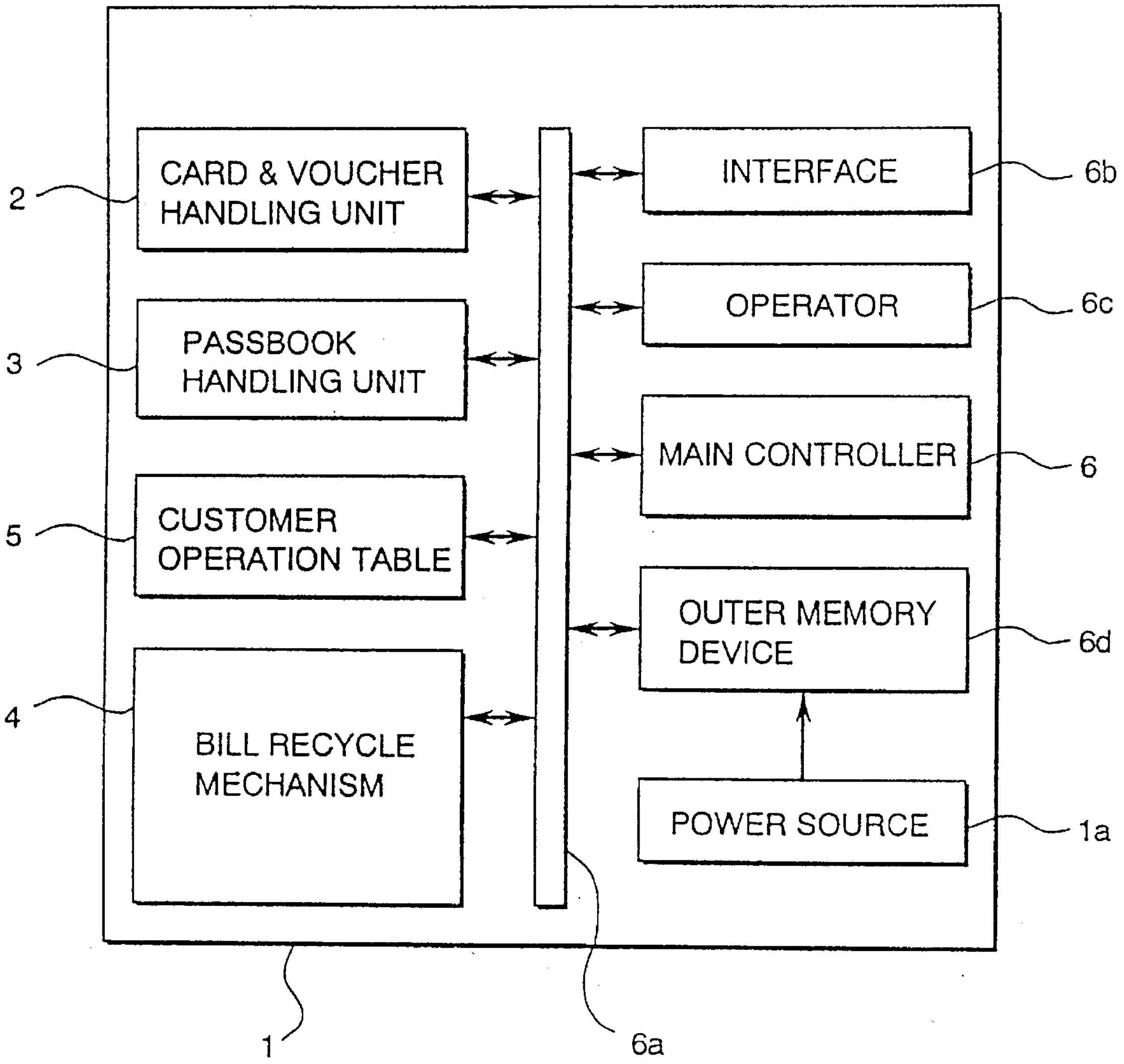
FIG. 6 is a block diagram showing the control relationship of the transaction machine.

FIG. 6 is a block diagram showing the control relationship of the transaction machine. As mentioned above, the card & voucher handling unit 2, the passbook handling unit 3, the bill recycle mechanism 4, and the customer operation table 5 which are installed in the outer box 1 are connected to the main controller unit 6 via a bus 6*a* and perform necessary operations under control of the main controller unit 6. The main controller unit 6 is also connected to an interface 6*b*, an operator 6*c*, and an outer memory device 6*d* via the bus 6*a* in addition to the above and sends or receives necessary data to or from them. However, it is not directly related to the characteristics of the present invention, so that detailed explanation will be omitted. In FIG. 6, a numeral 1*a* indicates a power source for supplying power to the aforementioned mechanisms and components thereof.

Next, the operation of the embodiment described in FIGS. 1 to 6 will be explained with reference to FIGS. 7 to 11.

Loading

Figure 7:
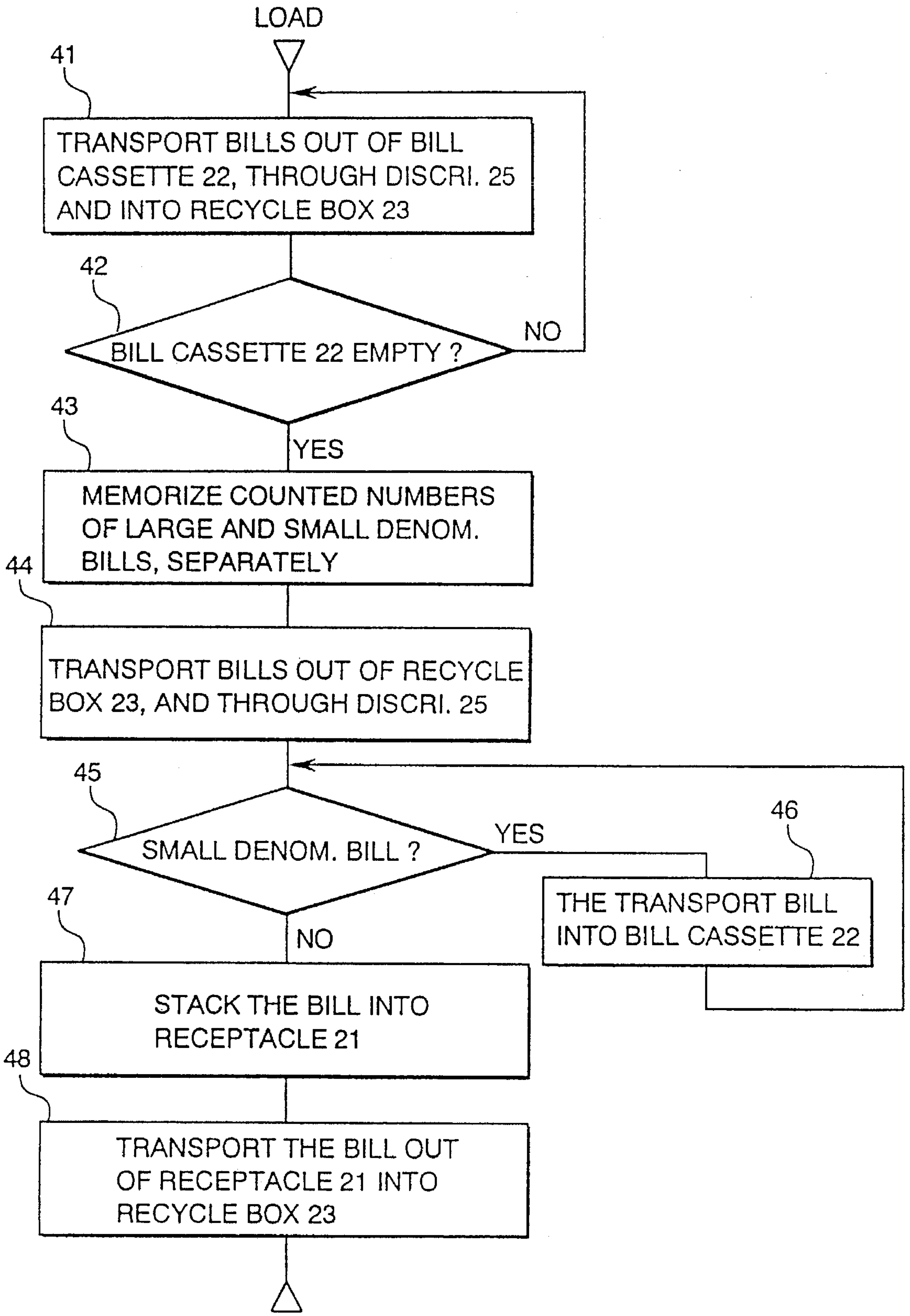
FIG. 7 is a flow chart showing the control procedure for loading.

FIG. 7 is a flow chart showing the control procedure for loading. Before starting to operate this transaction machine, when an operator sets bills in the bill cassette 22, large denomination bills are set on the upper side and small denomination bills are set on the lower side. The transaction machine transports the bills from the bill cassette 22 and counts, transports, and stores all the bills in the recycle box 23 once through the bill discriminator 25 (Step 41). The bills which are sent from the bill discriminator 25 pass through the transport path 28 installed under the receptacle 21 shown in FIG. 2 and are transported and stored in the recycle box 23. When it is detected that the bills of the bill cassette 22 are all transported and the cassette becomes empty (Step 42), the counted number for each bill kind of the large and small denomination bills which are transported to the recycle box 23 is memorized (Step 43). The number of small denomination bills which are transported to the recycle box 23 is known by the previous counting and the bills are stored on the upper side of the recycle box 23. Next, the bills (small denomination bills) stored on the upper side in the recycle box 23 are transported to the discriminator 25 so as to discriminate the bill kind thereof. The discriminator discriminates whether they are small denomination bills (Step 45). When they are small denomination bills, the discriminator transports them to the bill cassette 22 so as to store (Step 46). This operation is repeated so as to store small denomination bills in the bill cassette 21. When the bills are discriminated as large denomination bills at Step 45, they are stacked in the receptacle 21 once (Step 47). The bills (large denomination bills) in the receptacle 21 are returned to the large denomination bills recycle box 23 (Step 48). By doing this, large denomination bills are loaded in the recycle box 23 and small denomination bills are loaded in the bill cassette 22. The numbers of large denomination bills and small denomination bills are memorized in the main controller unit 6 of the transaction machine. The bill cassette 22 can be used as a small denomination bills recycle box. Bills transported from the discriminator 25 are distributed by the gate which is installed in the transport path 28 and controlled by discrimination of the discriminator 25 and transported to the recycle box 23 and the bill cassette 22.

Payment

Figure 8:
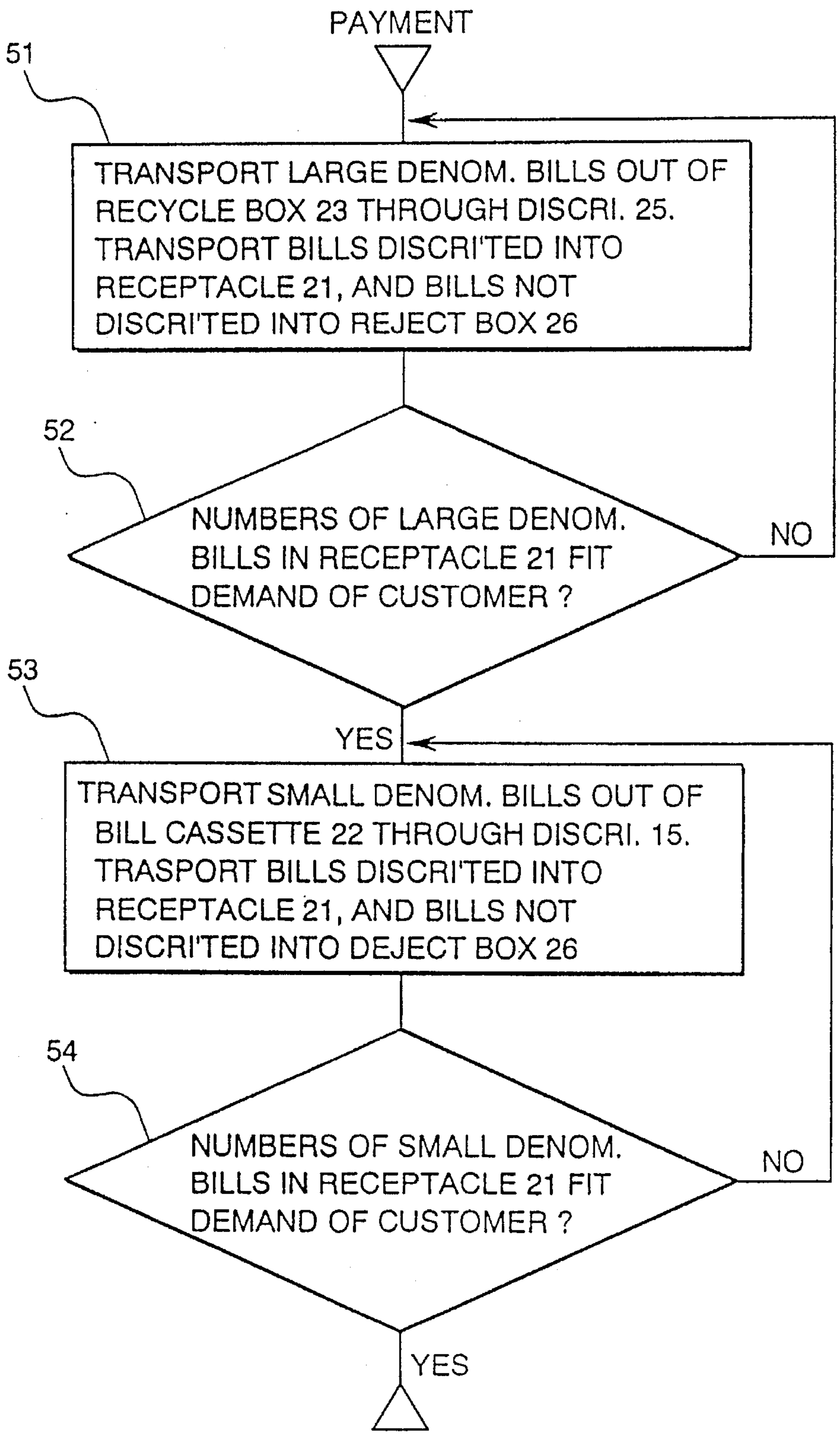
FIG. 8 is a flow chart showing the control procedure for payment.

FIG. 8 is a drawing showing the control procedure for payment. For payment, the designated number of large denomination bills is transported from the recycle box 23 and the designated number of small denomination bills is transported from the bill cassette 22 and they are transported to the cash receptacle 21 through the discriminator 25 and paid to a user.

Firstly, bills are transported from the recycle box 23 where large denomination bills are stored to the discriminator 15, and large denomination bills which can be discriminated are transported to the receptacle 21, and bills which cannot be discriminated are transported to the reject box 26 (Step 51). The discriminator 15 discriminates whether the designated number of large denomination bills is transported to the receptacle 21 (Step 52). When the number of transported bills does not reach the designated number, Step 51 is repeated.. When the number of transported bills reaches the designated number and there are small denomination bills designated, small denomination bills are transported from the bill cassette 22 to the discriminator 15 next, and bills which can be discriminated are transported to the receptacle 21, and bills which cannot be discriminated are transported to the reject box 26 (Step 53). The discriminator 15 discriminates whether the designated number of small denomination bills is transported to the receptacle 21 (Step 54). When the number of transported bills does not reach the designated number, Step 53 is repeated. Bills transported from the discriminator 25 are distributed by the gate which is installed in the transport path 28 and controlled by discrimination of the discriminator 25 in the same way as with loading and transported to the receptacle 21 and the reject box 26.

Deposit

Figure 9:
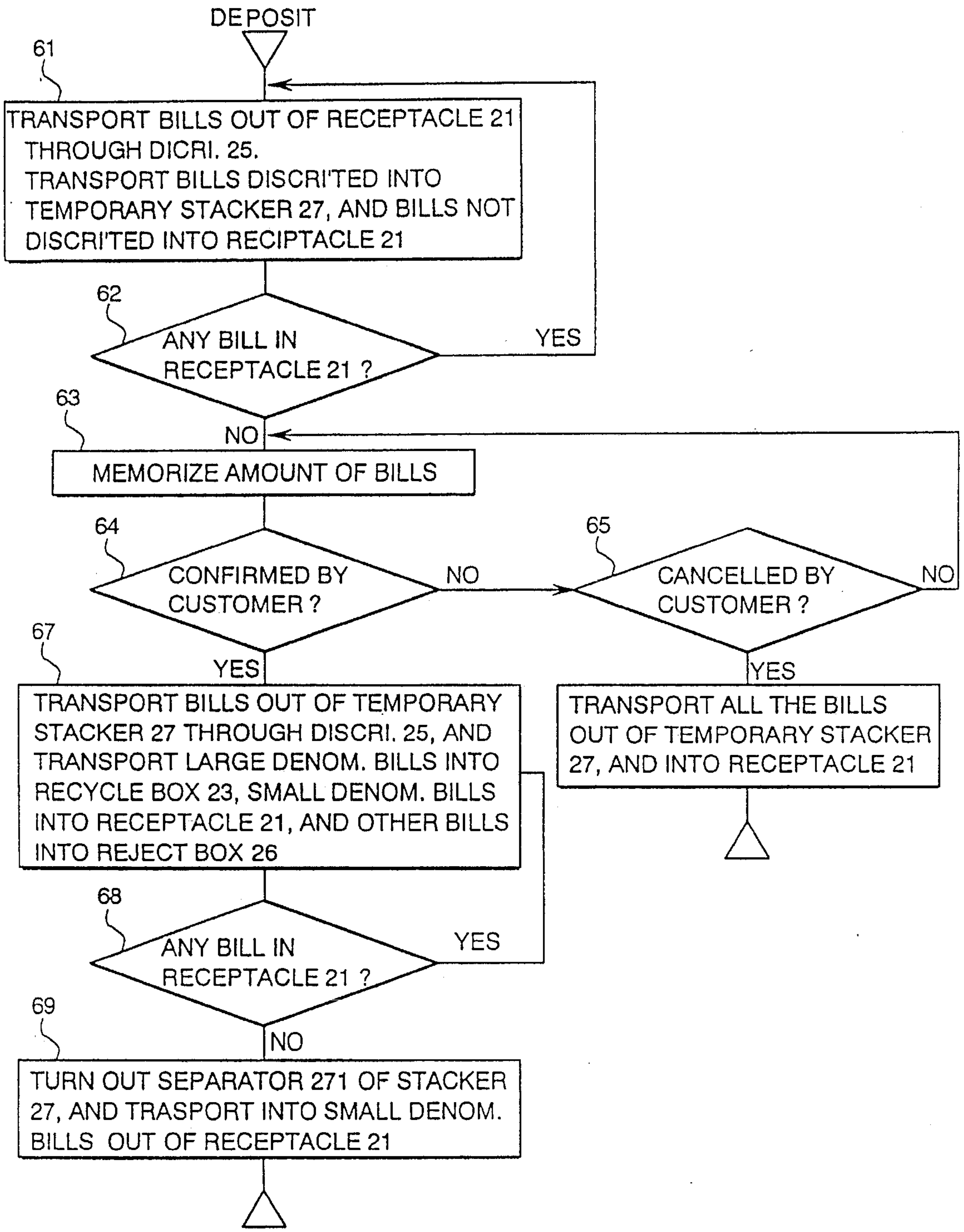
FIG. 9 is a flow chart showing the control procedure for deposit.

FIG. 9 is a drawing showing the control procedure for deposit. When deposit transaction is instructed, the bills which are inserted into the cash receptacle 21 by a user are transported to the discriminator 25. Bills which can be discriminated are stacked in the temporary stacker 27 and bills which cannot be discriminated are returned to the receptacle 21 (Step 61). It is decided whether there are bills in the receptacle 21 (Step 62). When the bills in the receptacle 21 are all transported, the deposited amount of money is counted and memorized (Step 63). The deposited amount of money is displayed on the customer operation display 5 so that the user can ascertain it. When it is canceled by the customer (Step 65), the bills stacked in the temporary stacker 27 are all transported to the receptacle 21 (Step 66) and returned to the user. When it is confirmed by the customer (Step 64), the bills stacked in the temporary stacker 27 are all transported to the discriminator 15, and large denomination bills are transported to the recycle box 23, and small denomination bills are transported to the receptacle 21, and the other bills are transported to the reject box 26 (Step 67). When the bills in the temporary stacker 27 are all transported (Step 68), the stacker of the temporary stacker 27 is turned out and the small denomination bills in the receptacle 21 are transported and stored in the bill cassette 22 (Step 69). By doing this, the large denomination bills among the deposited bills are transported to the recycle box 23, and the small denomination bills are stored in the bill cassette 22, and they can be flowed back and used as paying bills.

Withdrawal

Figure 10:
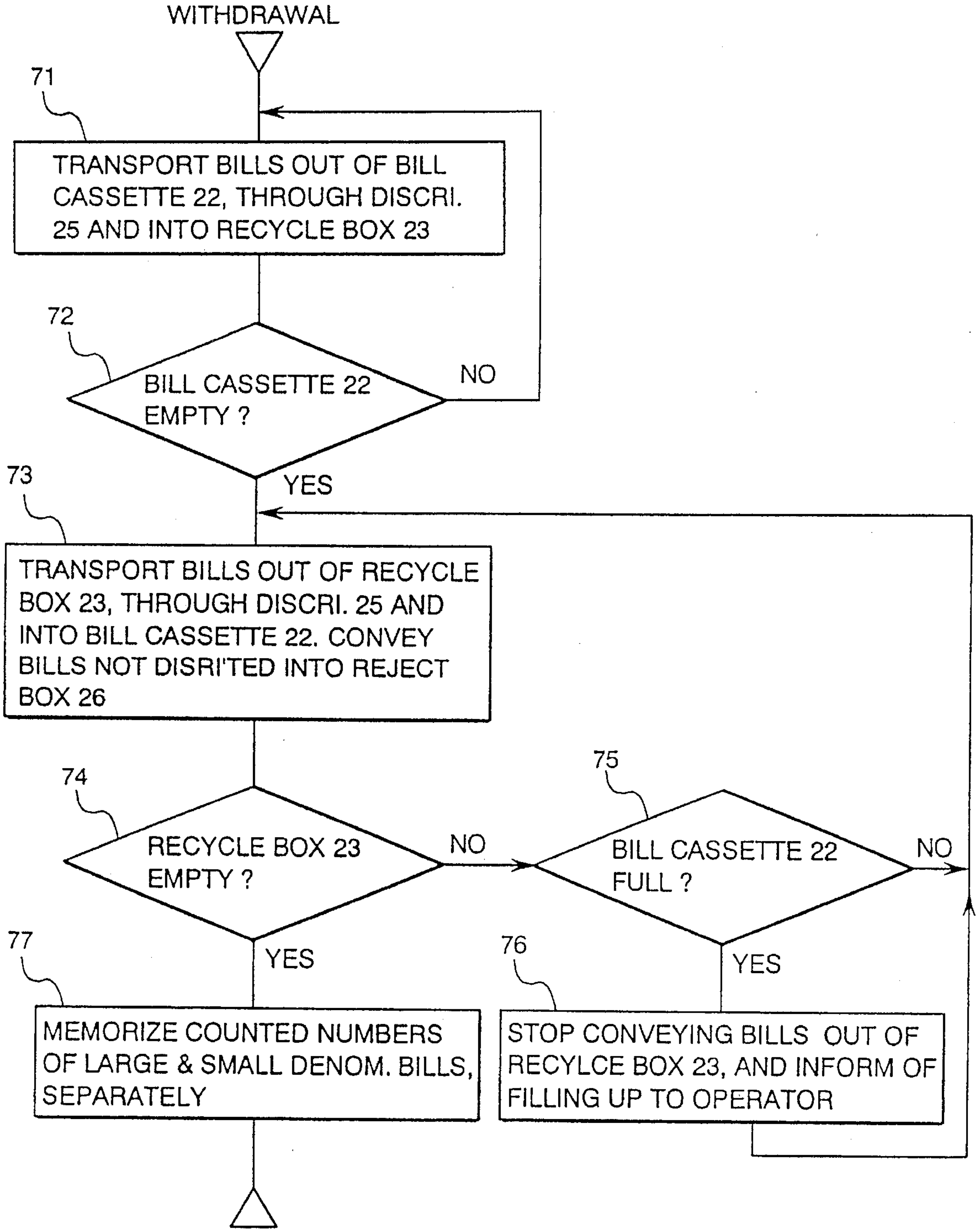
FIG. 10 is a flow chart showing the control procedure for withdrawal.

FIG. 10 is a drawing showing the control procedure for withdrawal. When the operation of this transaction machine is to end, the bills in the bill cassette 22 are all counted through the discriminator 25 once and transported to the recycle box 23 (Step 71). When the bill cassette 22 becomes empty (Step 72), bills are transported from the recycle box 23 to the bill cassette 22 while they are counted by the discriminator 25. Bills which cannot be discriminated are transported to the reject box 26 (Step 73). When it is detected before the recycle box 23 becomes empty that the bill cassette 22 is filled up (Step 75), the transaction machine stops the transfer of bills temporarily and displays that the bill cassette 22 is filled up so as to inform the operator of it. If this occurs, the operator replaces the bill cassette 22 with an empty one, so that transport from the recycle box 23 restarts. When it is detected that the recycle box 23 becomes empty (Step 74), the counted number for each bill kind of large and small denomination bills is memorized and the withdrawal is completed. By doing this, bills in the transaction machine can be counted and withdrawn into the bill cassette 22 and the operator can remove the bill cassette 22 and take out and withdraw the bills.

Inspection

Figure 11:
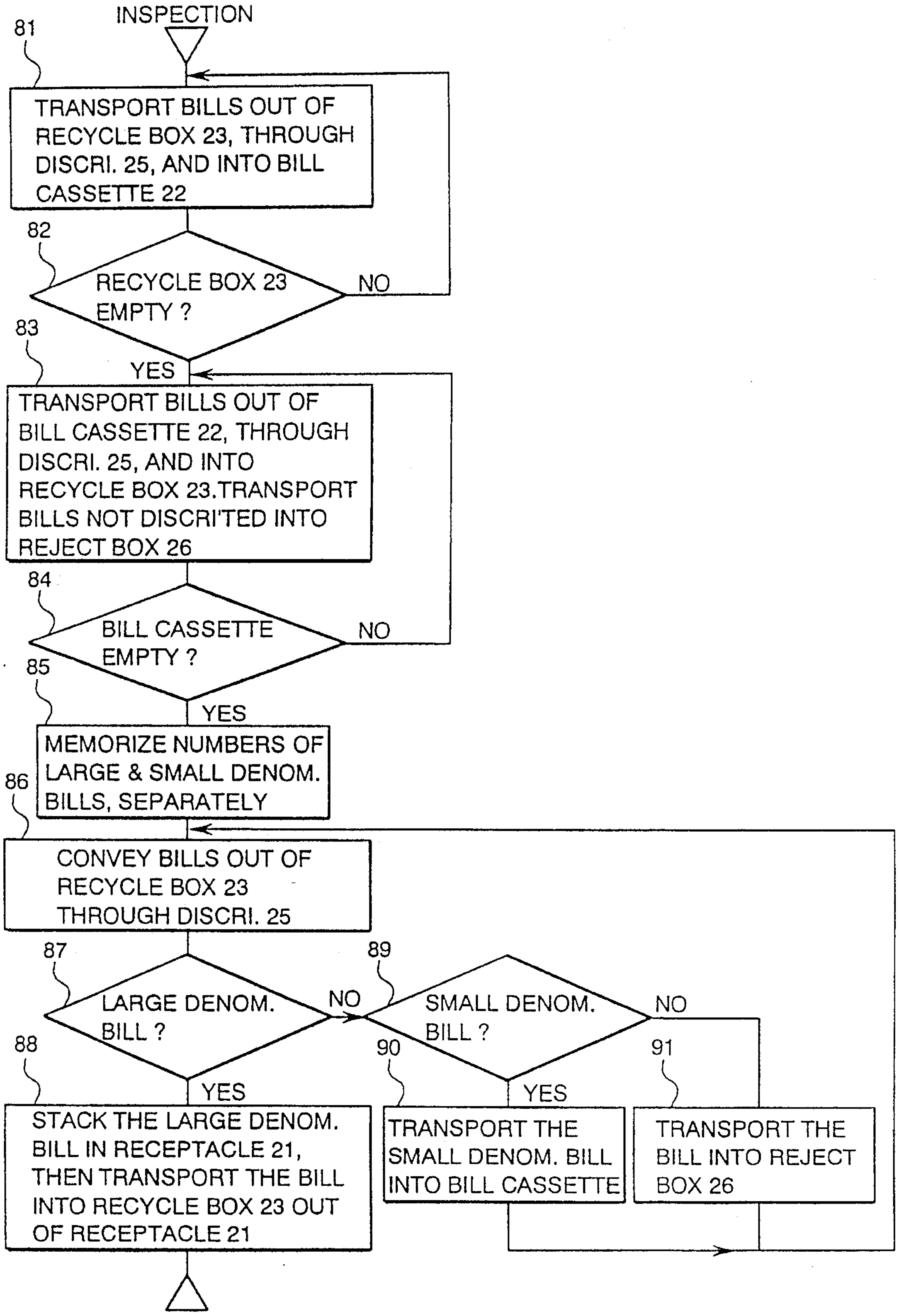
FIG. 11 is a flow chart showing the control procedure for inspection.

FIG. 11 is a drawing showing the control procedure for inspection. The operator can check the number of bills in the transaction machine by the inspection function. Firstly, bills are transported from the recycle box 23 to the bill cassette 22 through the discriminator 25. When the recycle box 23 becomes empty (Step 82), bills are transported from the bill cassette 22 to the recycle box 23 this time while they are counted by the discriminator (Step 83). Bills which cannot be discriminated are transported to the reject box 26. When the bill cassette 22 becomes empty (Step 84), the counted number for each bill kind of large and small denomination bills is memorized (Step 85). Next, bills are transported from the recycle box 23 and the bill kind is discriminated by the discriminator 25 (Step 86). When the bills are discriminated as large denomination bills, they are stacked in the receptacle 21 temporarily and returned to the recycle box 23 later (Step 88). When the bills are discriminated as small denomination bills (Step 89), they are transported and stored in the bill cassette 22 (Step 90). When the bills are not discriminated as large and small denomination bills (Step 89), they are transported and stored in the reject box 26 (Step 91). By doing this, the large and small denomination bills are returned to the recycle box 23 and the bill cassette 22 before the inspection is executed and the number of bills (the amount of money) in the transaction machine can be known.

Under the aforementioned control, the transaction machine can be miniaturized and the operations of loading, payment, deposit, withdrawal, inspection, and flowing back of bills can be executed by counting and managing the number of bills in the transaction machine.

Transaction choice indication

Figure 12:
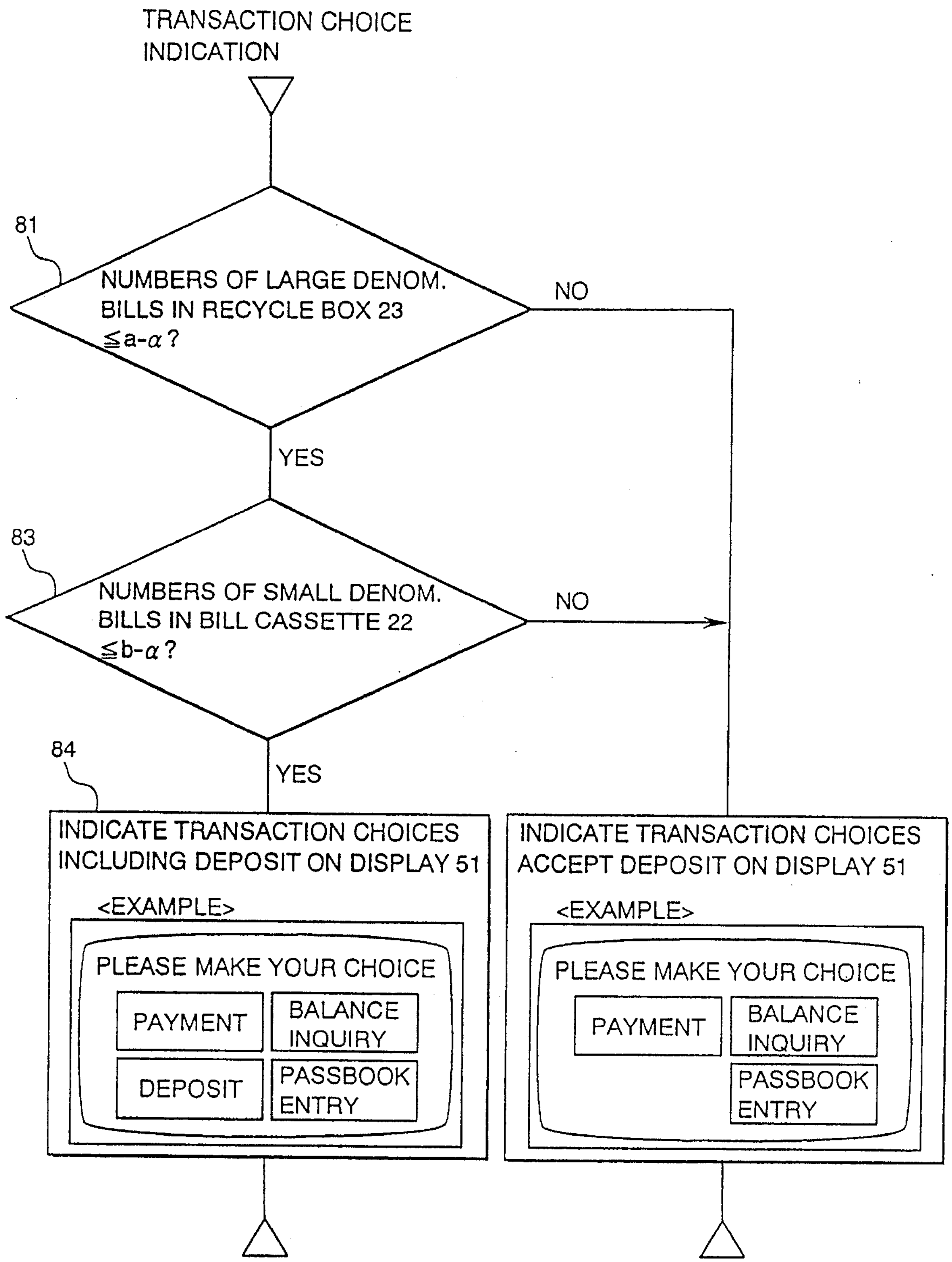
FIG. 12 is a flow chart showing the control procedure for transaction choice indication.

FIG. 12 is a drawing showing the control procedure for transaction choice indication of the operation display 5 so as to prevent bills from overflowing when small denomination bills in the bill cassette 22 are to be stored in the recycle box 23 once for loading or withdrawal of bills mentioned above. Assuming that the maximum number of storable bills of the recycle box 23 is A and the number of storable small denomination bills which are assigned to the bill cassette 22 is b, the number a of storable large denomination bills which are assigned to the recycle box 23 is set so that a formula of a=A−b holds. On the other hand, a counter which is not shown in the drawing is installed in the main controller unit 6 and memorizes the number of stored large denomination bills of the recycle box 23 or small denomination bills of the bill cassette 22 when they are deposited or paid. In the case of transaction choice indication, the main controller unit 6 decides whether the number of stored large denomination bills which is memorized in the counter is "a−α" or less first (Step 81). In this case, α indicates the maximum number of bills which can be deposited at a time. When the number of stored large denomination bills is more than "a−α", the main controller unit 6 indicates transaction choices other than the deposit bills on the customer operation table 5 (Step 82) and stops the deposit transaction. When the number of stored large denomination bills is "a−α" or less, the main controller unit 6 also decides whether the number of small denomination bills which is memorized in the counter is "b−α" or less (Step 83). As a result of the above decision, when the numbers of stored large and small denomination bills are not more than the predetermined values, the main controller unit 6 indicates transaction choices including normal deposit on the customer operation table 5. When the number of one of stored large and small denomination bills is more than the predetermined number, the main controller unit 6 indicates transaction choices other than the deposit bills on the customer operation table 5 (Step 82) and stops the deposit transaction.

When the transaction choice indication of the customer operation table 5 is switched as mentioned above, the total of the numbers of stored large denomination bills and small denomination bills in the transaction machine will not exceed the maximum number of storable bills A of the recycle box 23 and when bills in the transaction machine are withdrawn, they can be prevented from overflowing.

When the storing units of the recycle box 23 and of the bill cassette 22 are structured so that the maximum number A of stored bills of the recycle box 23 becomes equal to two times of the maximum number B of storable bills of the bill cassette 22 (A=2B) and the number a of storable large denomination bills in the recycle box 23 and the number b of storable small denomination bills in the bill cassette 22 are set so as to be equal to B, the size of the storing unit of the bill cassette 22, that is, the maximum number B of stored bills of the bill cassette 22 exceeds the limit when large denomination bills and small denomination bills are set for each bill kind of large and small denomination bills in the bill cassette 22 as mentioned above and bills are prevented from overflowing. Namely, the operator can set bills without taking account of the number a of storable large denomination bills and the number b of storable small denomination bills, so that the burden for setting bills can be lightened.

If A=2B and a=b=B are set as mentioned above, when bills in the transaction machine are to be withdrawn, they can be easily withdrawn by dividing them into bill kinds of large denomination bills and small denomination bills.

In the aforementioned first embodiment, an example that the bill cassette 22 and the recycle box 23 of a type that bills are inserted from above and taken out from above (top-in top-out on a structure basis and last-in first-out on an order basis) are used is shown. However, there is no limit to it. A type that an operation for inserting bills from above and an operation for transporting bills from underneath can be performed in parallel at the same time (top-in bottom-out on a structure basis and first-in firstout on an order basis) can be used for one or both of them. As a bill box of the aforementioned top-in bottom-out type, a well-known bill box as indicated in Japanese Patent Application Laid-Open 5-278959 may be used.

Figure 13:
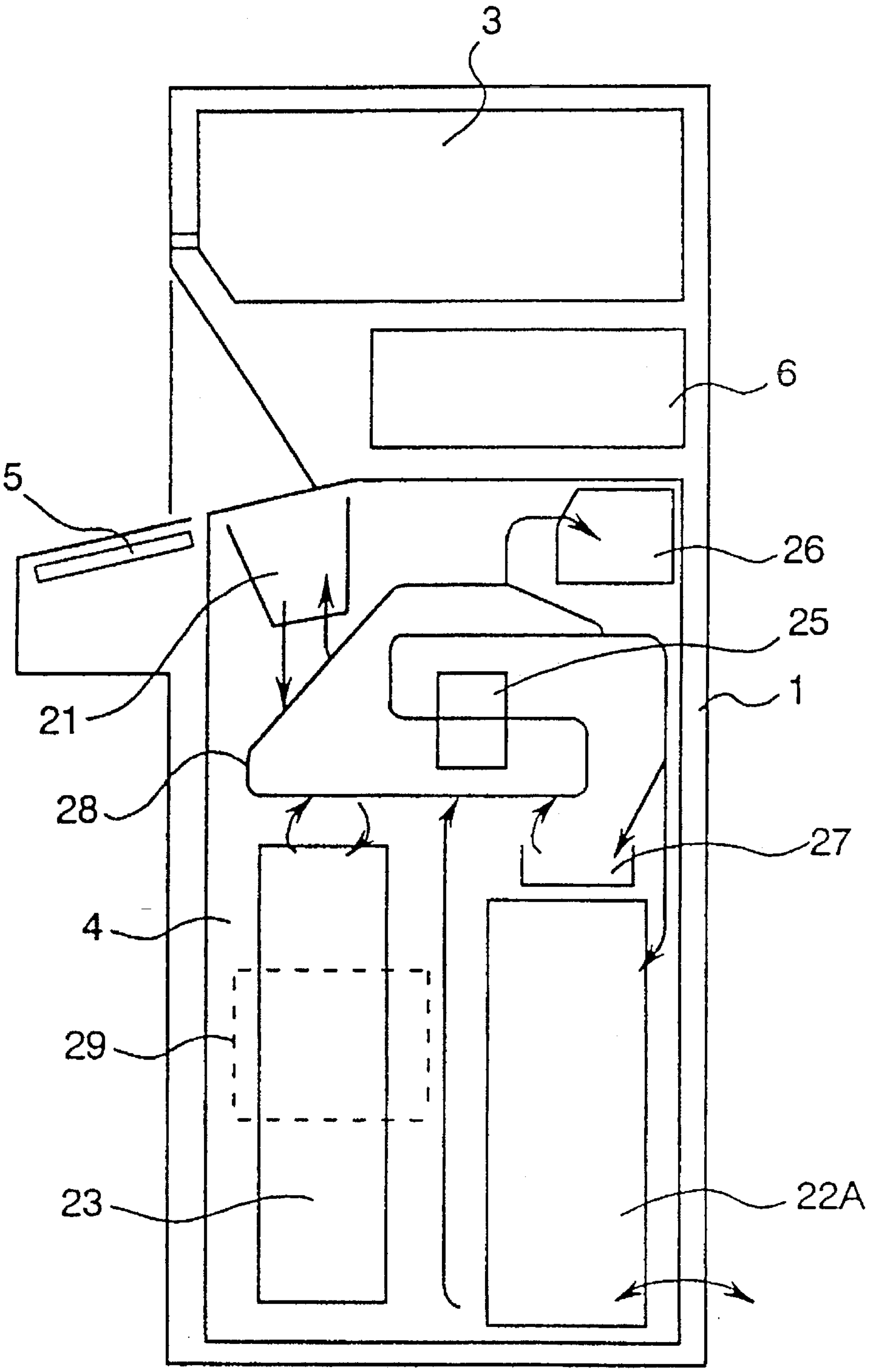
FIG. 13 is a cross-sectional view of another embodiment of the present invention.

FIG. 13 shows a case that a bill cassette of the top-in bottom-out type is used as a bill cassette 22A. In FIG. 13, the components other than the bill cassette 22A are the same as those shown in FIG. 2. The operations of the transaction machine shown in FIG. 13 are slightly different from those shown in FIG. 2. Loading which is most characteristic will be explained hereunder. The other operations are self-evident from the explanation shown in FIGS. 8 to 11.

Loading

Figure 14:
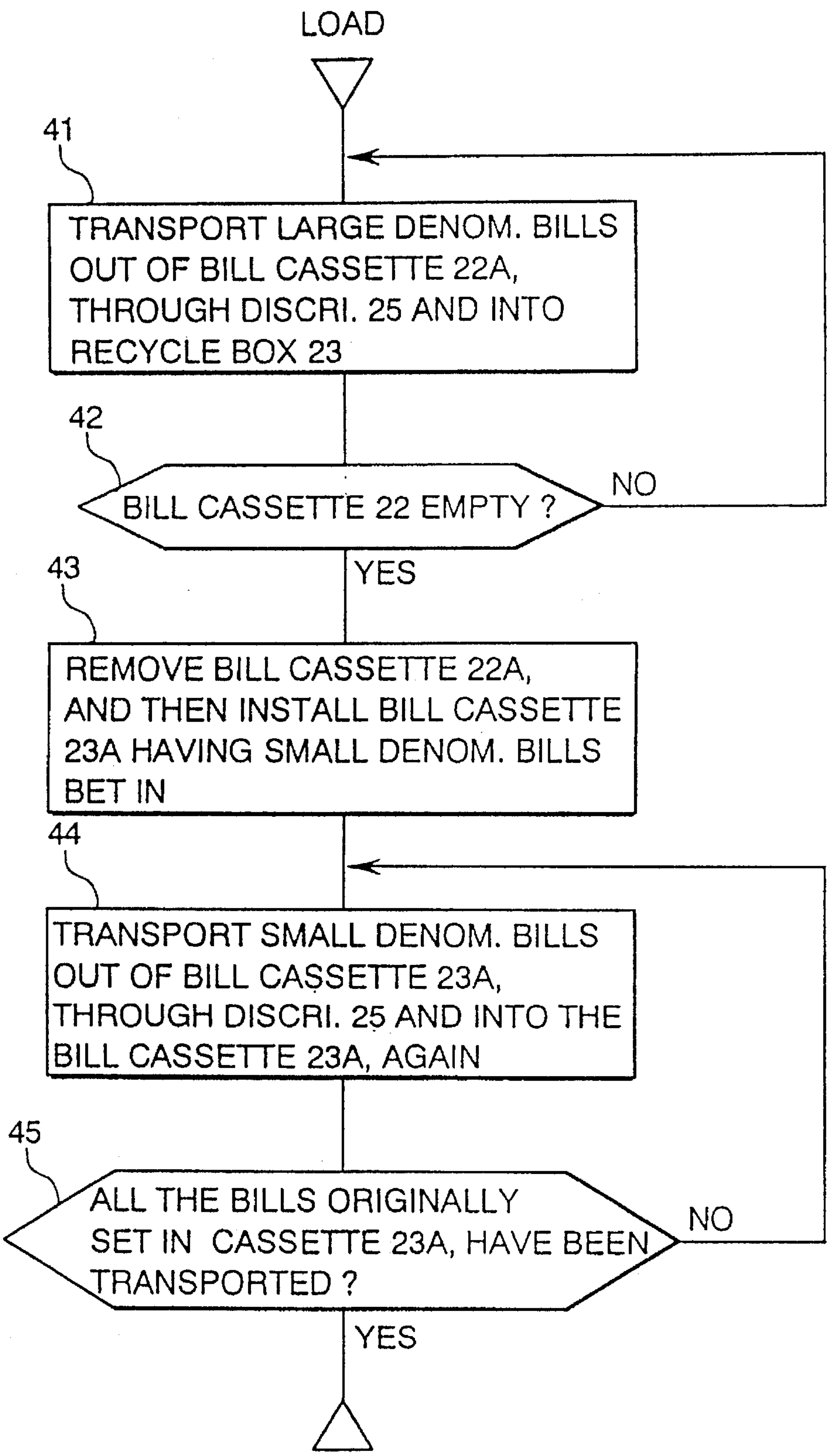
FIG. 14 is a flow chart showing the control procedure for loading in the above another embodiment.

FIG. 14 is a drawing showing the control procedure for loading. Before starting to operate this transaction machine, the large denomination bills which are to be stored in the recycle box 23 are set in the bill cassette 22A first. The transaction machine transports the large denomination bills from the bill cassette 22A and counts, transports, and stores all the large denomination bills in the recycle box 23 through the bill discriminator 25 (Step 41). The bills which are sent from the bill discriminator 25 pass through the transport path 28 installed above the bill cassette 22A shown in FIG. 13 and are transported and stored in the recycle box 23. When it is detected that the bills of the bill cassette 22A are all transported and the cassette becomes empty (Step 42), the empty bill cassette 22A is removed and small denomination bills are set in the bill cassette 22A (Step 43). The transaction machine transports the bills from the bill cassette 22A again and counts, transports, and stores all the bills in the bill cassette 22A again through the bill discriminator 25 (Step 44). The bill cassette 22A separates bills from underneath and stacks counted bills on the upper part thereof at the same time. When it is detected that the bills which are set in the bill cassette 22A first are all transported and the bills which are discriminated are stored in the bill cassette 22A (Step 45), the loading operation ends. By doing this, the large denomination bills are loaded in the recycle box 23 and the small denomination bills are loaded in the bill cassette 22A. The numbers of large denomination bills and small denomination bills are memorized in the main controller unit 6 of the transaction machine. The bill cassette 22A can be used as a recycle box for small denomination bills. Bills transported from the discriminator 25 are distributed by the gate which is installed in the transport path 28 and controlled by discrimination of the discriminator 25 and transported to the recycle box 23 and the bill cassette 22A.

Figure 15:
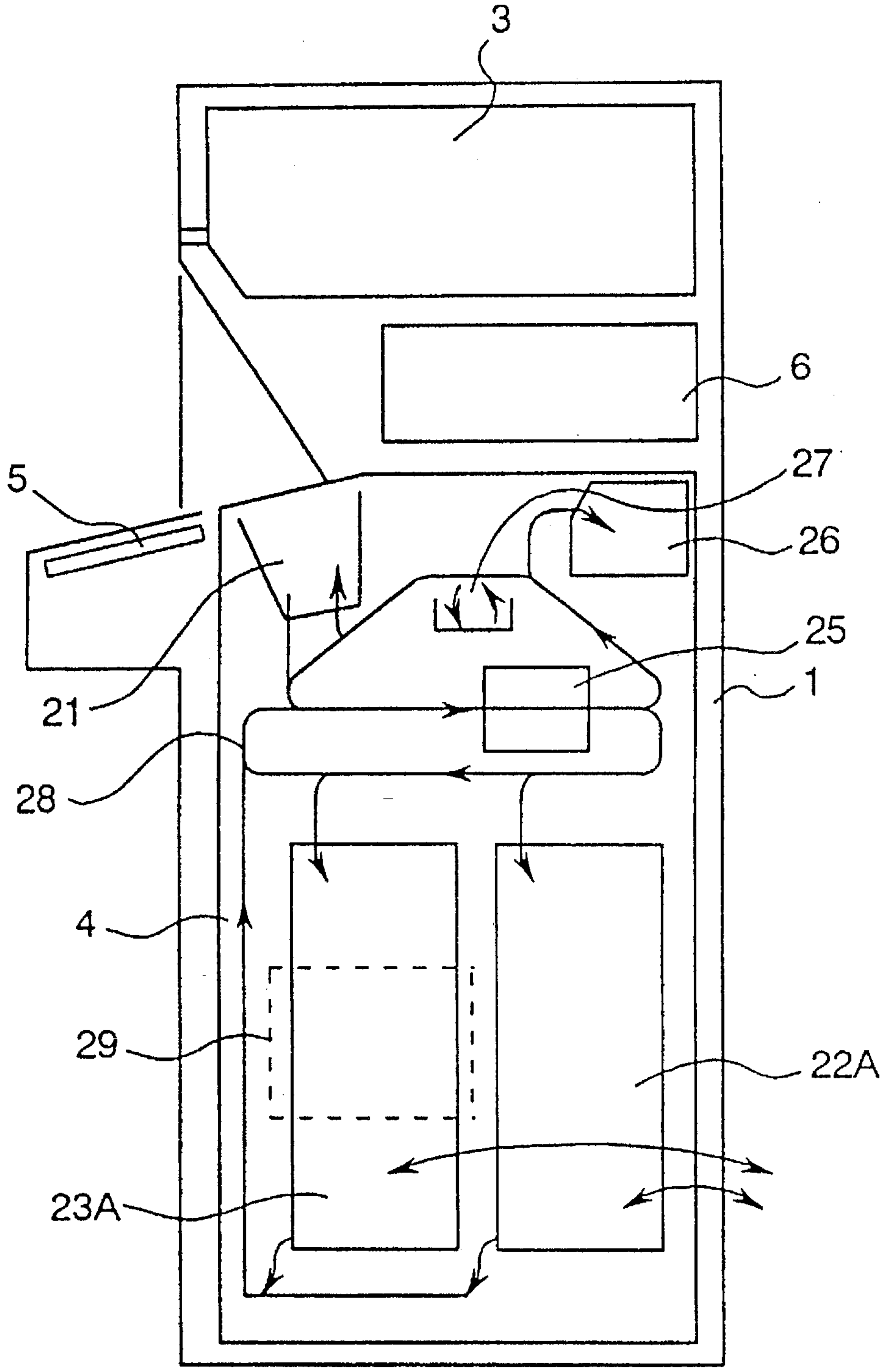
FIG. 15 is a cross-sectional view of another embodiment of the present invention.

Furthermore, FIG. 15 shows an example that both of the recycle box 23A and the bill cassette 22A are of the top-in bottom-out type and also the recycle box 23A can be removed. In this example, large denomination bills and small denomination bills can be loaded or withdrawn by the recycle box 23A and the bill cassette 22A respectively on a self-completion basis.

What is claimed is:

1. An automatic cash transaction machine comprising a outer box which has an upper front plate and a lower front plate and in which the horizontal cross-sectional shape at an optional location in the vertical direction is almost square, a bill recycle box which is installed inside the lower part of said outer box, on the operator's side viewed from front, and in the neighborhood of said lower front plate, and a customer operation table which is installed between the upper part of said outer box and the lower part of the outer box and has a cash gateway on the innermost side viewed from front and an operation display at the central part on the operator's side, wherein the leading edge of said operation display of said customer operation table is protruded froward from said lower front plate of said outer box and said cash gateway of said customer operation table is positioned right above said bill recycle box.

2. An automatic cash transaction machine comprising a main frame which has an upper front plate, a lower front plate, and a back plate and in which the horizontal cross-sectional shape at an optional location in the vertical direction is almost square, a bill recycle box which is installed inside the lower part of said outer box, on the operator's side viewed from front, and in the neighborhood of said lower front plate, a bill cassette which is installed on the innermost side of said bill recycle box and in the neighborhood of said back plate so that it can be removed from said outer box, and a customer operation table which is installed between the upper part of said outer box and the lower part of the outer box and has a cash gateway on the innermost side viewed from front and an operation display at the center on the operator's side, wherein the leading edge of said operation display of said customer operation table is protruded forward from said lower front plate of said outer box and said cash gateway of said customer operation table is positioned right above said bill recycle box.

3. An automatic cash transaction machine according to claim 1, wherein said transaction machine further comprises a card handling unit which is installed inside the upper part of the outer box and a passbook slot which is linked to said card handling unit and installed on the upper front plate.

4. An automatic cash transaction machine according to claim 1, wherein said transaction machine further comprises a passbook handling unit which is installed inside the upper part of the outer box and a passbook slot which is linked to said passbook handling unit and installed on the upper front plate.

5. An automatic cash transaction machine according to claim 1, wherein the upper front plate is positioned before the trailing edge of the receptacle.

6. An automatic cash transaction machine according to claim 1, wherein the surface of the customer operation table is formed at a rising gradient toward the innermost side.

7. An automatic cash transaction machine according to claim 1, wherein the operation display consists of a liquid crystal display unit.

8. An automatic cash transaction machine comprising a outer box which has an upper front plate, a lower front plate, and a back plate and in which the horizontal cross-sectional shape at an optional location in the vertical direction is almost square, a bill recycle box which is installed inside the lower part of said outer box, on the operator's side viewed from front, and in the neighborhood of said lower front plate and has a first bill take-out and put-in mechanism, a bill cassette which is installed on the innermost side of said bill recycle box and in the neighborhood of said back plate so that it can be removed from said outer box and has a second bill take-out and put-in mechanism, a cash receptacle which is installed inside the center of said outer box and above said bill recycle box and has a third bill take-out and put-in mechanism, a bill discriminator which is positioned above said bill cassette, and a bill transport control mechanism which has a bill transport path which is connected to said first bill take-out and put-in mechanism, said second bill take-out and put-in mechanism, and said third bill take-out and put-in mechanism so that it can operate and transports bills of the first bill kind by operating said third bill take-out and put-in mechanism and said first bill take-out and put-in mechanism between said cash receptacle and said bill recycle box, bills of the second bill kind by operating said third bill take-out and put-in mechanism and said second bill take-out and put-in mechanism between said cash receptacle and said bill cassette, and bills of the first bill kind and the second bill kind by operating said first bill take-out and put-in mechanism and said second bill take-out and put-in mechanism between said bill recycle box and said bill cassette respectively through said bill discriminator.

9. An automatic cash transaction machine according to claim 8, wherein both of the first bill take-out and put-in mechanism and the second bill take-out and put-in mechanism are a last-in first-out type bill take-out and put-in mechanism.

10. An automatic cash transaction machine according to claim 8, wherein one of the first bill take-out and put-in mechanism and the second bill take-out and put-in mechanism is a last-in first-out type bill take-out and put-in mechanism and the other is a first-in first-out type bill recycle mechanism.

11. An automatic cash transaction machine according to claim 8, wherein both of the first bill take-out and put-in mechanism and the second bill take-out and put-in mechanism are a first-in first-out type bill take-out and put-in mechanism.

12. An automatic cash transaction machine according to claim 1, wherein the bill recycle box also can be removed from the outer box.

13. An automatic cash transaction machine according to claim 2, wherein said transaction machine further comprises a card handling unit which is installed inside the upper part of the outer box and a passbook slot which is linked to said card handling unit and installed on the upper front plate.

14. An automatic cash transaction machine according to claim 2, wherein said transaction machine further comprises a passbook handling unit which is installed inside the upper part of the outer box and a passbook slot which is linked to said passbook handling unit and installed on the upper front plate.

15. An automatic cash transaction machine according to claim 2, wherein the upper front plate is positioned before the trailing edge of the receptacle.

16. An automatic cash transaction machine according to claim 2, wherein the surface of the customer operation table is formed at a rising gradient toward the innermost side.

17. An automatic cash transaction machine according to claim 2, wherein the operation display consists of a liquid crystal display unit.

18. An automatic cash transaction machine according to claim 2, wherein the bill recycle box also can be removed from the outer box.

* * * * *